(12) United States Patent
Anumala et al.

(10) Patent No.: US 12,519,630 B2
(45) Date of Patent: Jan. 6, 2026

(54) APPROACH TO PROTECT HARDWARE MANAGED INTEGRATED CRYPTOGRAPHIC ENGINE KEYS EFFICIENTLY WHILE PREVENTING DATA AT REST ATTACKS

(71) Applicant: QUALCOMM Incorporated, San Diego, CA (US)

(72) Inventors: Sridhar Anumala, Hyderabad (IN); Bharani Bhuvanagiri, Hyderabad (IN); Nishanth Kumar, Dharmasthala (IN); Dhananjayan Athiyappan, Bengaluru (IN); Madhu Yashwanth Boenapalli, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 249 days.

(21) Appl. No.: 18/301,305

(22) Filed: Apr. 17, 2023

(65) Prior Publication Data
US 2024/0348437 A1    Oct. 17, 2024

(51) Int. Cl.
*H04L 9/08*    (2006.01)
(52) U.S. Cl.
CPC ............ *H04L 9/088* (2013.01); *H04L 9/0819* (2013.01)
(58) Field of Classification Search
CPC ...................................... H04L 9/088
See application file for complete search history.

(56) References Cited

U.S. PATENT DOCUMENTS

| | | | |
|---|---|---|---|
| 10,411,894 B1* | 9/2019 | Yavnilovich | .......... H04W 12/06 |
| 2006/0190724 A1 | 8/2006 | Adams et al. | |
| 2022/0200800 A1* | 6/2022 | Xu | ........................ H04L 9/088 |
| 2024/0348437 A1* | 10/2024 | Anumala | ................ H04L 9/088 |

FOREIGN PATENT DOCUMENTS

WO    2019226510 A1    11/2019

OTHER PUBLICATIONS

Anonymous: "AWS Key Management Service—Developer Guide", AWS, Nov. 25, 2019, 387 Pages, XP055693941, Enabling and Disabling Keys, pp. 45-46 p. 134.
International Search Report and Written Opinion—PCT/US2024/018505—ISA/EPO—May 22, 2024. 13 pages.

* cited by examiner

*Primary Examiner* — Simon P Kanaan
(74) *Attorney, Agent, or Firm* — Muncy, Geissler, Olds & Lowe, P.C.

(57) ABSTRACT

Various embodiments include methods implemented in a processor for management of cryptographic keys of an integrated cryptographic engine. Embodiments may include detecting a cryptographic key access control event, determining whether the cryptographic key access control event is for disabling cryptographic key access at a cryptographic key memory of the integrated cryptographic engine, disabling cryptographic key access at the cryptographic key memory in response to determining that the cryptographic key access control event is for disabling cryptographic key access at the cryptographic key memory, and maintaining one or more cryptographic keys at the cryptographic key memory for which cryptographic key access is disabled. Embodiments may further include enabling cryptographic key access at the cryptographic key memory in response to determining that the cryptographic key access control event (Continued)

is not for disabling cryptographic key access at the cryptographic key memory.

30 Claims, 10 Drawing Sheets

APPROACH TO PROTECT HARDWARE MANAGED INTEGRATED CRYPTOGRAPHIC ENGINE KEYS EFFICIENTLY WHILE PREVENTING DATA AT REST ATTACKS

BACKGROUND

Storage data protection is tied to hardware bounded cryptographic keys using cryptographic components like an integrated cryptographic engine (ICE). While a computing device is running, the cryptographic keys are programmed to an ICE memory. Encryption/decryption of all the sensitive data operations are directed through the ICE using the cryptographic keys already programmed. Without protective measures, the cryptographic keys are accessible for any read/write operations irrespective of the computing device state, such as a lock/unlock state. Leaving the cryptographic keys unprotected makes sensitive data vulnerable to data at rest attacks even when the computing device is in a locked state. Current protective measures for the cryptographic keys include evicting the cryptographic keys from the ICE memory for a computing device states, such as a locked state or data at rest state, and regenerating and reprogramming the cryptographic keys to the ICE memory for another computing device state, such as an unlocked state.

SUMMARY

Various aspects include apparatuses and methods for implementing management of cryptographic keys of an integrated cryptographic engine. Various aspects may include detecting a cryptographic key access control event, determining whether the cryptographic key access control event is for disabling cryptographic key access at a cryptographic key memory of the integrated cryptographic engine, disabling cryptographic key access at the cryptographic key memory in response to determining that the cryptographic key access control event is for disabling cryptographic key access at the cryptographic key memory, and maintaining one or more cryptographic keys at the cryptographic key memory for which cryptographic key access is disabled.

Some aspects may further include, following disabling cryptographic key access at the cryptographic key memory receiving a data request, attempting to retrieve a cryptographic key from the cryptographic key memory, and sending an error response.

In some aspects, disabling cryptographic key access at the cryptographic key memory may include setting one or more cryptographic key access indicators associated with the one or more cryptographic keys to a disable value.

Some aspects may further include enabling cryptographic key access at the cryptographic key memory in response to determining that the cryptographic key access control event is not for disabling cryptographic key access at the cryptographic key memory.

Some aspects may further include, following enabling cryptographic key access at the cryptographic key memory receiving a data request, attempting to retrieve a cryptographic key from the cryptographic key memory, and sending the cryptographic key.

In some aspects, enabling cryptographic key access at the cryptographic key memory may include setting one or more cryptographic key access indicators associated with the one or more cryptographic keys to an enable value.

Further aspects may further include receiving a cryptographic key access control policy parameter for the one or more cryptographic keys configured to enable a cryptographic key access control policy, and enabling the cryptographic key access control policy for the one or more cryptographic keys in response to receiving the cryptographic key access control policy parameter.

In some aspects, enabling the cryptographic key access control policy for the one or more cryptographic keys may include associating the one or more cryptographic keys with one or more one or more cryptographic key access indicators.

Further aspects include computing devices including a processor configured to perform operations of any of the methods summarized above. Further aspects include computing devices having means for performing any of the functions of the methods summarized above. Further aspects include a non-transitory processor-readable storage medium having stored thereon processor-executable instructions configured to cause a processor of a computing device to perform the functions of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
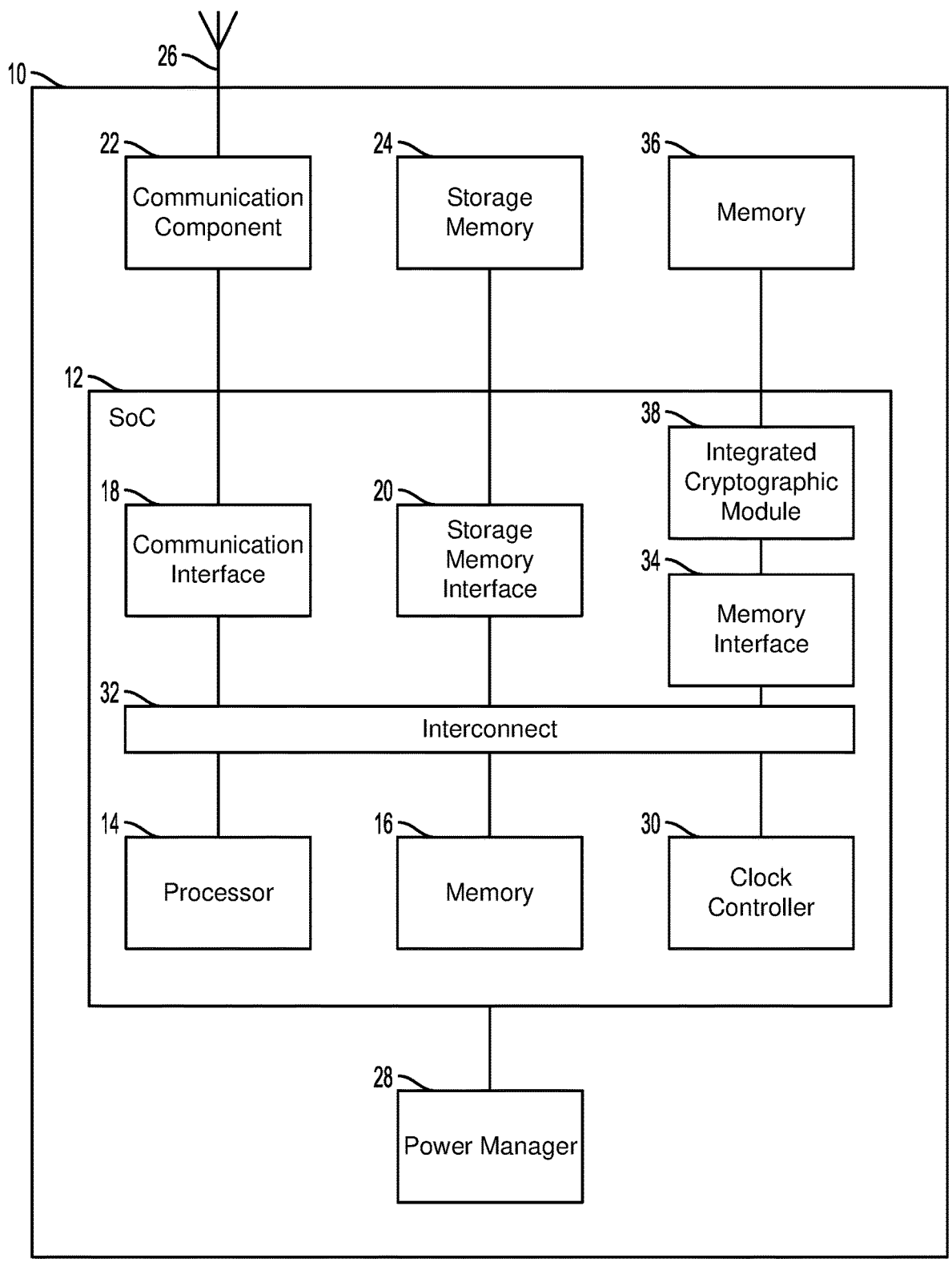
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices implementing such methods, for management of cryptographic keys for an integrated cryptographic engine. In some embodiments, management of the cryptographic keys for the integrated cryptographic engine includes maintaining one or more cryptographic keys at a cryptographic key memory of the integrated cryptographic engine and controlling access the cryptographic keys based on an event of a computing device. Controlling access to the cryptographic keys may include disabling access to the cryptographic keys at the cryptographic key memory based on one event, and enabling to the cryptographic keys at the cryptographic key memory based on another event. The cryptographic keys may be maintained at the cryptographic key memory while access to the cryptographic keys at the cryptographic key memory is disabled. In some embodiments, the cryptographic keys may be programmed to the integrated cryptographic engine associating the cryptographic keys with cryptographic key access control policy. In some embodiments, the cryptographic keys may be programmed to the integrated cryptographic engine associating the cryptographic keys with a cryptographic key access indicator configured to indicate to the integrated cryptographic engine whether cryptographic key access is disabled and/or enabled.

The terms "computing device" and "mobile device" are used interchangeably herein to refer to any one or all of cellular telephones, smartphones, personal or mobile multimedia players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Storage data protection is tied to hardware bounded cryptographic keys using cryptographic components like an integrated cryptographic engine (ICE). While a computing device is running, the cryptographic keys are programmed to an integrated cryptographic engine memory. Encryption/decryption of all the sensitive data operations are directed through the integrated cryptographic engine using the cryptographic keys already programmed. Without protective measures, the cryptographic keys are accessible for any read/write operations irrespective of the computing device state, such as a lock/unlock state. Leaving the cryptographic keys unprotected makes sensitive data vulnerable to data at rest attacks even when the computing device is in a locked state.

Current protective measures for the cryptographic keys include evicting the cryptographic keys from the integrated cryptographic engine memory for a computing device state where the cryptographic keys may not be used, such as a locked state or a data at rest state, and regenerating and reprogramming the cryptographic keys to the integrated cryptographic engine memory for a computing device state where the cryptographic keys may be used, such as an unlocked state. This protective measure is inefficient, consuming computing device resources and causing performance degradation during each instance of reprogramming the cryptographic keys to the integrated cryptographic engine memory. The same cryptographic keys must be regenerated, such as by implementing key derivation functions to generate cryptographic keys and/or unwrapping encrypted cryptographic keys, and be reprogrammed to the integrated cryptographic engine memory for each change to the computing device state where the cryptographic keys may be used. The cost of regenerating and reprogramming the cryptographic keys to the integrated cryptographic engine memory increases based on the number of cryptographic keys.

Embodiments address and overcome the inefficiencies of regenerating and reprogramming the cryptographic keys to the integrated cryptographic engine memory for each change to the computing device state where the cryptographic keys may be used. Embodiments include a cryptographic key access control scheme for a cryptographic key memory for the integrated cryptographic engine. Rather than repeatedly evict, regenerate, and reprogram the cryptographic keys, embodiments maintain the cryptographic keys at a cryptographic key memory for the integrated cryptographic engine and control access to the cryptographic keys at the cryptographic key memory based on the states of the computing device. Embodiments avoid the cost of regenerating and reprogramming the cryptographic keys after initial generation and programming of the cryptographic keys at the cryptographic key memory.

Embodiments include programming the cryptographic keys to the cryptographic key memory for the integrated cryptographic engine. A cryptographic key may be associated with a cryptographic key access control policy at the integrated cryptographic engine. The cryptographic key may be associated with a cryptographic key access indicator at the cryptographic key memory configured to indicate to the integrated cryptographic engine whether cryptographic key access is disabled and/or enabled.

A secure master may be configured to detect a cryptographic key access control event, such as a change in computing device state. For example, the computing device state may include a lock state and an unlock state. The secure master may be configured to interpret the cryptographic key access control event as triggering disabling and/or enabling cryptographic key access at the cryptographic key memory for the integrated cryptographic engine. For example, the secure master may interpret a change to the lock state of the computing device as triggering disabling cryptographic key access at the cryptographic key memory and a change to the unlock state as enabling cryptographic key access at the cryptographic key memory. The secure master may signal to the integrated cryptographic engine whether to disable and/or enable cryptographic key access at the cryptographic key memory based on interpretating the cryptographic key access control event.

The integrated cryptographic engine may be configured to disable and/or enable cryptographic key access at the cryptographic key memory for the integrated cryptographic engine based on the signal from the secure master may. For example, a signal to disable cryptographic key access at the cryptographic key memory may trigger the integrated cryptographic engine to set a cryptographic key access indicator associated with the cryptographic key at the cryptographic key memory to indicate to the integrated cryptographic engine that cryptographic key access is disabled. A signal to enable cryptographic key access at the cryptographic key memory may trigger the integrated cryptographic engine to set the cryptographic key access indicator associated with the cryptographic key at the cryptographic key memory to indicate to the integrated cryptographic engine that cryptographic key access is enabled.

The integrated cryptographic engine may be configured to check the cryptographic key access indicator associated with the cryptographic key at the cryptographic key memory of the integrated cryptographic engine in response to a data request by a non-secure master. The integrated cryptographic engine may be configured to determine whether the cryptographic key access indicator associated with the cryptographic key indicates that cryptographic key access to the cryptographic key is disabled and/or enabled. In response to determining that cryptographic key access to the cryptographic key is disabled, the integrated cryptographic engine may be configured to deny access to the cryptographic key at the cryptographic key memory. In response to determining that cryptographic key access to the cryptographic key is enabled, the integrated cryptographic engine may be configured to allow access to the cryptographic key at the cryptographic key memory.

FIG. 1 illustrates a system including a computing device 10 suitable for use with various embodiments. The computing device 10 may include a system-on-chip (SoC) 12 with a processor 14, a memory 16, a memory interface 34, an integrated cryptographic module 38, a communication interface 18, a storage memory interface 20, a clock controller 30, and an interconnect 32. The computing device 10 may further include a communication component 22, such as a wired or wireless modem, a storage memory 24, an antenna 26 for establishing a wireless communication link, a power manager 28, and a memory 36. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), neural network processing unit (NPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The computing device 10 may include any number and combination of memories, such as the memory 16 integral to the SoC 12 and the memory 36 separate from the SoC 12. Any of the memories 16, 36 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random access memory (RAM) or main memory, including static RAM (SRAM), such as the memory 16, dynamic RAM (DRAM), such as the memory 36, or cache memory.

The memories 16, 36 may be configured to temporarily store a limited amount of data. For example, the data may be received from a data sensor or subsystem. As another example, the data may be data and/or processor-executable code instructions that are requested from a non-volatile memory 16, 24, 36 loaded to the memories 16, 36 from the non-volatile memory 16, 24, 36 in anticipation of future access based on a variety of factors. As another example, the data may be intermediary processing data and/or processor-executable code instructions produced by the processor 14 and temporarily stored for future quick access without being stored in non-volatile memory 16, 24, 36.

The memory interface 34 may work in unison with the memory 36 to enable the computing device 10 to store and retrieve data and processor-executable code on and from the memory 36. The memory interface 34 may control access to the storage memory 36 and allow the processor 14 to read data from and write data to the memory 36.

The storage memory interface 20 and the storage memory 24 may work in unison to allow the computing device 10 to store data and processor-executable code on a non-volatile storage medium, such as a nonvolatile memory device. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The integrated cryptographic module 38 may be configured to implement cryptographic functions, such as encryption and decryption, of data for transactions of the memory storage device 24. Data transmitted between the memory 36 and the storage memory 24 may be encrypted and decrypted by the integrated cryptographic module 38 to secure the data stored at the memory storage device 24 by encrypting the data, and make usable, by the SoC 12, the encrypted data retrieved from the memory storage device 24 by decrypting the data. The integrated cryptographic module 38 may be configured with multiple cryptographic cores (not shown) configured for implementing the cryptographic functions. The integrated cryptographic module 38 may be configured with a cryptographic key memory (not shown) configured for storing one or more cryptographic keys used for implementing the cryptographic functions. In some implementations, the integrated cryptographic module 38 may be a standalone component of the SoC 12. In some implementations, the integrated cryptographic module 38 may be integral to another component of the SoC 12, such as the memory interface 34, the storage memory interface 20, the processor 14, the multi-data stream memory controller, etc.

The power manager 28 may be configured to control power states of one or more power rails (not shown) for power delivery to the components of the SoC 12. In some embodiments, the power manager 28 may be configured to control amounts of power provided to the components of the SoC 12. For example, the power manager 28 may be configured to control connections between components of the SoC 12 and the power rails. As another example, the power manager 28 may be configured to control amounts of power on the power rails connected to the components of the SoC 12. The power manager 28 may be configured as a power management integrated circuit (power management ICs or PMIC).

A clock controller 30 may be configured to control clock signals transmitted to the components of the SoC 12. For example, the clock controller 30 may gate a component of the SoC 12 by disconnecting the component of the SoC 12 from a clock signal and may ungate the component of the SoC 12 by connecting the component of the SoC 12 to the clock signal.

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2A:
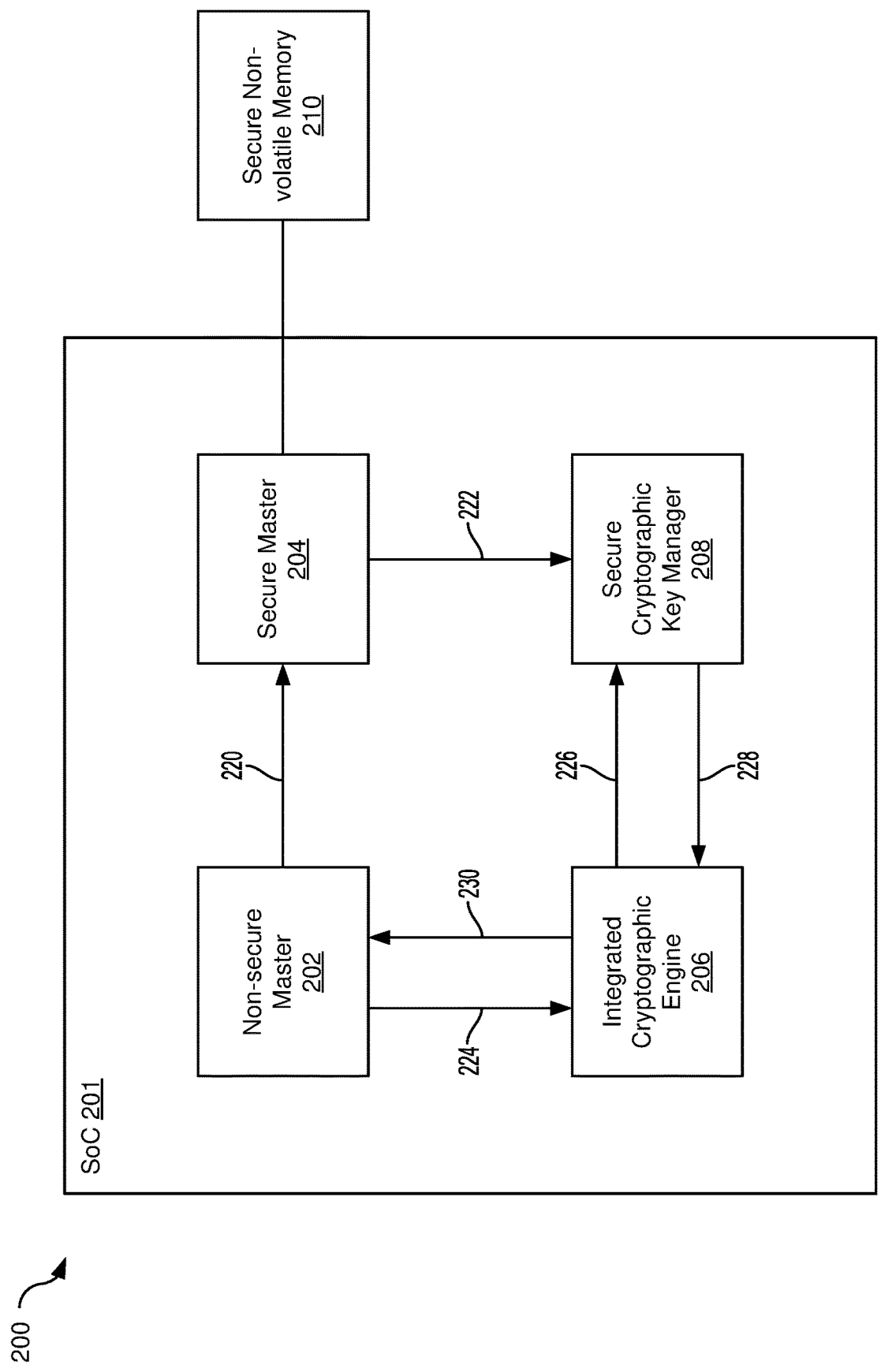
FIGS. 2A and 2B are component block diagrams illustrating an example cryptography key access control system suitable for implementing various embodiments.
Figure 2B:
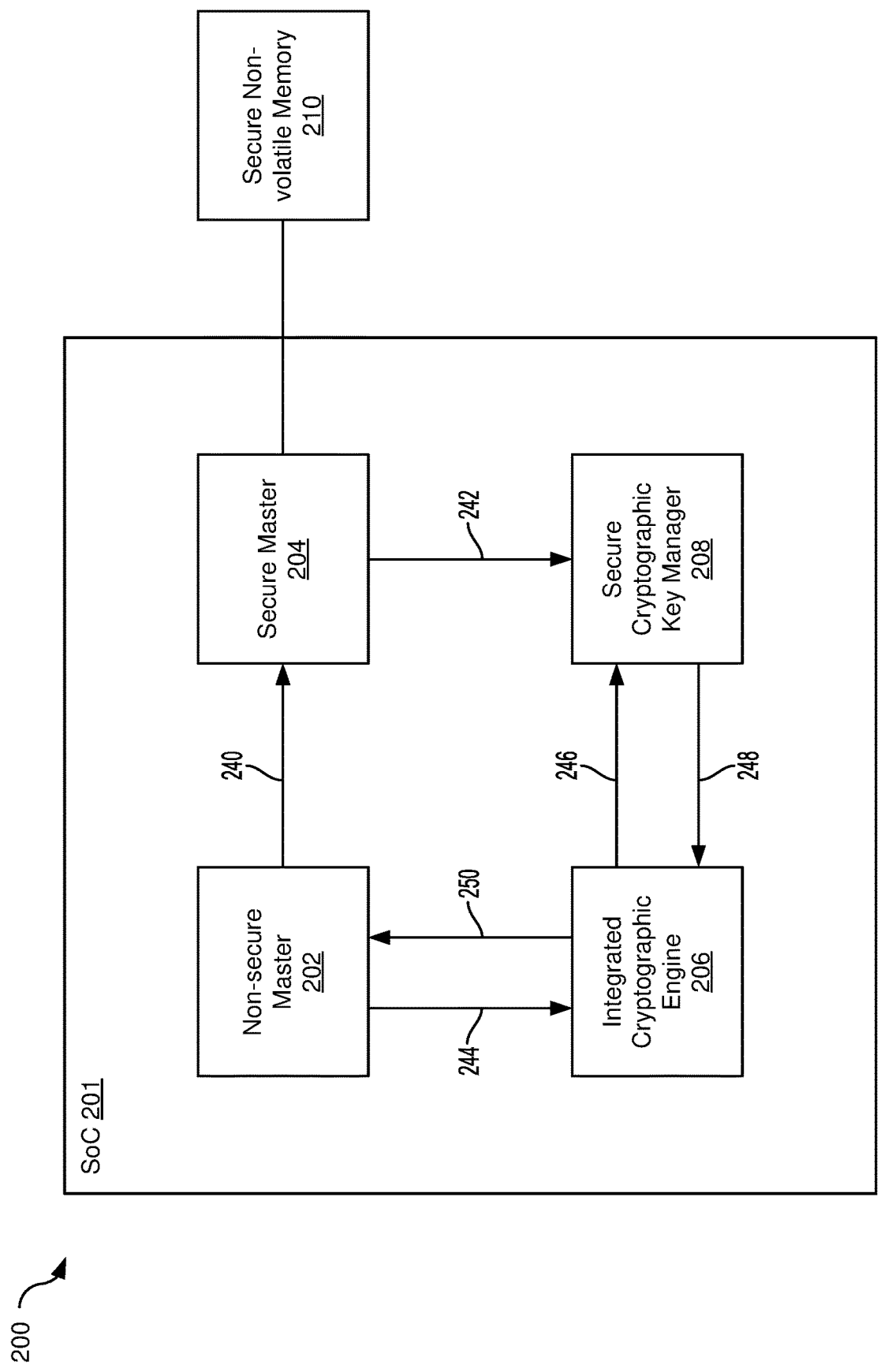

FIGS. 2A and 2B illustrate an example of a cryptography key access control system suitable for implementing various embodiments. With reference to FIGS. 1-2B, the cryptography key access control system 200 may include an SoC 201 (e.g., SoC 12 in FIG. 1) and a secure non-volatile memory 210 (e.g., storage memory 24, memory 36 in FIG. 1).

The SoC 201 may include a processor (not shown; e.g., processor 14 in FIG. 1) configured with processor-executable instructions for implementing a non-secure master 202, such as one or more applications. Examples of the one or more applications may include high level operating systems, game applications, productivity applications, entertainment applications, web browser applications, communication applications, etc. In some examples, the non-secure master 202 may execute in a The SoC 201 may include one or more processors (not shown; e.g., processor 14, integrated cryptographic module 38 in FIG. 1) configured with processor-executable instructions and/or hardware for implementing a secure master 204, an integrated cryptographic engine 206, and a secure cryptographic key manager 208. In some examples, the secure cryptographic key manager 208 may be an integral component of the integrated cryptographic engine 206.

In some examples, one or more of the non-secure masters 202, the secure master 204, the integrated cryptographic engine 206, and/or the secure cryptographic key manager 208 may be implemented by the same processor. In some examples, the SoC 201 and/or the processors may include a normal execution environment and a secure execution environment (or trusted execution environment; e.g., ARM TrustZone, AMD Secure Technology, IBM Secure Service Container, Intel Trusted Execution Technology, etc.). The non-secure master 202 may be executed in the normal execution environment of the SoC 201 and/or the processor. The secure master 204 may be executed in the secure execution environment of the SoC 201 and/or the processor. The integrated cryptographic engine 206 and/or the secure cryptographic key manager 208 may be implemented in the normal execution environment and/or the secure execution environment of the SoC 201 and/or the processor.

The secure non-volatile memory 210 may be accessible by one or more components of the SoC 201. For example, the secure non-volatile memory 210 may be accessible by the secure master 204. For another example, the secure non-volatile memory 210 may be accessible by components of the secure execution environment of the SoC 201 and/or the processor. The secure non-volatile memory 210 may be configured with stored data including one or more cryptographic keys used for implementing cryptographic functions of the integrated cryptographic engine 206, as described further herein.

The cryptographic keys stored at the secure non-volatile memory 210 may be programmed to the integrated cryptographic engine 206. For example, the integrated cryptographic engine 206 may include a memory (not shown; e.g., memory 16 in FIG. 1) to which the cryptographic keys may be stored. The secure master 204 may be configured to retrieve the cryptographic keys from the secure non-volatile memory 210 and store the cryptographic keys at the integrated cryptographic engine 206. The secure master 204 may also store associations of the cryptographic keys with cryptographic key access control policy indicators. The cryptographic key access control policy indicators may be configured to indicate whether the cryptographic key access control policy is enabled for the cryptographic keys to the secure master 204. The secure cryptographic key manager 208 may store associations of the cryptographic keys with cryptographic key access indicators. The cryptographic key access indicators may be configured to indicate whether cryptographic key access is disabled and/or enabled for the cryptographic keys to the secure cryptographic key manager 208. Programming the cryptographic keys to the integrated cryptographic engine 206 may occur, for example, as part of and/or in response to boot up of the SoC 201.

The secure master 204 may store the associations of the cryptographic keys with the cryptographic key access control policy indicators in a file, a data structure, a database, etc. in a memory (not shown; e.g., memory 16 in FIG. 1), such as a memory of the processor executing the secure master 204, a memory of the secure master 204 hardware, and/or the memory of the integrated cryptographic engine 206. In some examples, the secure master 204 may receive cryptographic key access control policy parameters for the cryptographic keys from the non-secure master 202 indicating to the secure master 204 whether to set the cryptographic key access control policy indicators as enabled. The secure master 204 may set the cryptographic key access control policy indicators as enabled for the cryptographic keys in response to the cryptographic key access control policy parameters indicating to set the cryptographic key access control policy indicators as enabled.

The secure cryptographic key manager 208 may store the associations of the cryptographic keys with the cryptographic key access indicators in a file, a data structure, a database, etc. in a memory (not shown; e.g., memory 16 in FIG. 1), such as a memory of the processor executing the secure cryptographic key manager 208, a memory of the secure cryptographic key manager 208 hardware, and/or the memory of the integrated cryptographic engine 206. The secure cryptographic key manager 208 may receive signals from the secure master 204 configured to indicate to the secure cryptographic key manager 208 whether to disable and/or enable cryptographic key access for the cryptographic keys as described further herein. The secure cryptographic key manager 208 may set the cryptographic key access indicators as disabled and/or enabled for the cryptographic keys in response to the signals from the secure master 204 indicating to disable and/or enable cryptographic key access.

The secure master 204 may be configured to detect a cryptographic key access control event, such as a change in computing device state of a computing device (e.g., computing device 10 in FIG. 1). For example, the cryptographic key access control event may include switching between a lock state and an unlock state, etc. The secure master 204 may be configured to interpret different cryptographic key access control events for trigger disabling and/or enabling cryptographic key access. In response to the detecting the cryptographic key access control event, the secure master 204 may be configured to determine whether cryptographic keys stored at the integrated cryptographic engine 206 have the cryptographic key access control policy enabled. The secure master 204 may determine whether the cryptographic keys have the cryptographic key access control policy enabled from the associations of the cryptographic keys with the cryptographic key access control policy indicators. The secure master 204 may be configured to signal to disable and/or enable cryptographic key access of the cryptographic keys having the cryptographic key access control policy enabled to the secure cryptographic key manager 208.

The secure cryptographic key manager 208 may be configured to interpret the signal from the secure master 204 to disable and/or enable cryptographic key access and respond by updating the cryptographic key access indicators associated with the cryptographic keys. Updating the cryptographic key access indicators may include setting the cryptographic key access indicators to a disable value and/or an enable value.

In some examples, the secure master 204 master may be configured to determine whether one or different groups of the cryptographic keys that have the cryptographic key access control policy enabled for the same and/or different cryptographic key access control events. The secure master 204 may be configured to signal to disable and/or enable cryptographic key access of the one or different groups of the cryptographic keys having the cryptographic key access control policy enabled to the secure cryptographic key manager 208. The secure cryptographic key manager 208 may be configured interpret the signal from the secure master 204 to disable and/or enable cryptographic key access and respond by updating the cryptographic key access indicators associated with the one or different groups of the cryptographic keys. In some examples, a group of the cryptographic keys may include at least one cryptographic key.

The secure cryptographic key manager 208 may be configured to interpret a cryptographic key request from the integrated cryptographic engine 206 and respond based on whether cryptographic key access is disabled and/or enabled for one or more cryptographic key of the cryptographic key request. The secure cryptographic key manager 208 may determine whether the cryptographic keys have the cryptographic key access disabled and/or enabled from the associations of the cryptographic keys with the cryptographic key access indicators. For a cryptographic key having cryptographic key access disabled, the secure cryptographic key manager 208 may send an error message to the integrated cryptographic engine 206. For a cryptographic key having cryptographic key access enabled, the secure cryptographic key manager 208 may send the cryptographic key to the integrated cryptographic engine 206.

FIG. 2A illustrates an example of the cryptography key access control system 200 implementing disabled cryptographic key access. The secure master 204 may receive a cryptographic key access control event signal 220 from the non-secure master 202 configured to indicate to the secure master 204 a cryptographic key access control event for disabling cryptographic key access. The secure master 204 may respond to the cryptographic key access control event signal 220 by determining that one or more cryptographic keys have the cryptographic key access control policy enabled and send a disable cryptographic key access signal 222 to the secure cryptographic key manager 208. The secure cryptographic key manager 208 may receive the disable cryptographic key access signal 222 and respond by setting the cryptographic key access indicators associated with the one or more cryptographic keys to a disable value.

The integrated cryptographic engine 206 may receive a data request signal 224 from the non-secure master 202 and respond by sending a cryptographic key request signal 226 for one or more cryptographic keys for implementing the data request to the secure cryptographic key manager 208. The secure cryptographic key manager 208 may determine that cryptographic key access is disabled for the one or more cryptographic keys and return an error signal 228 to the integrated cryptographic engine 206. The integrated cryptographic engine 206 may return an error signal 230 to the non-secure master 202.

FIG. 2B illustrates an example of the cryptography key access control system 200 implementing enabled cryptographic key access. The secure master 204 may receive a cryptographic key access control event signal 240 from the non-secure master 202 configured to indicate to the secure master 204 a cryptographic key access control event for enabling cryptographic key access. The secure master 204 may respond to the cryptographic key access control event signal 240 by determining that one or more cryptographic keys have the cryptographic key access control policy enabled and send an enable cryptographic key access signal 242 to the secure cryptographic key manager 208. The secure cryptographic key manager 208 may receive the enable cryptographic key access signal 242 and respond by setting the cryptographic key access indicators associated with the one or more cryptographic keys to an enable value.

The integrated cryptographic engine 206 may receive a data request signal 244 from the non-secure master 202 and respond by sending a cryptographic key request signal 246 for one or more cryptographic keys for implementing the data request to the secure cryptographic key manager 208. The secure cryptographic key manager 208 may determine that cryptographic key access is enabled for the one or more cryptographic keys and return a cryptographic key signal 248 to the integrated cryptographic engine 206. The cryptographic key signal 248 may include the one or more cryptographic keys and/or means for accessing the one or cryptographic keys, such as a memory address. The integrated cryptographic engine 206 may implement the data request using the one or more cryptographic keys and return a result signal 250 to the non-secure master 202.

Figure 3:
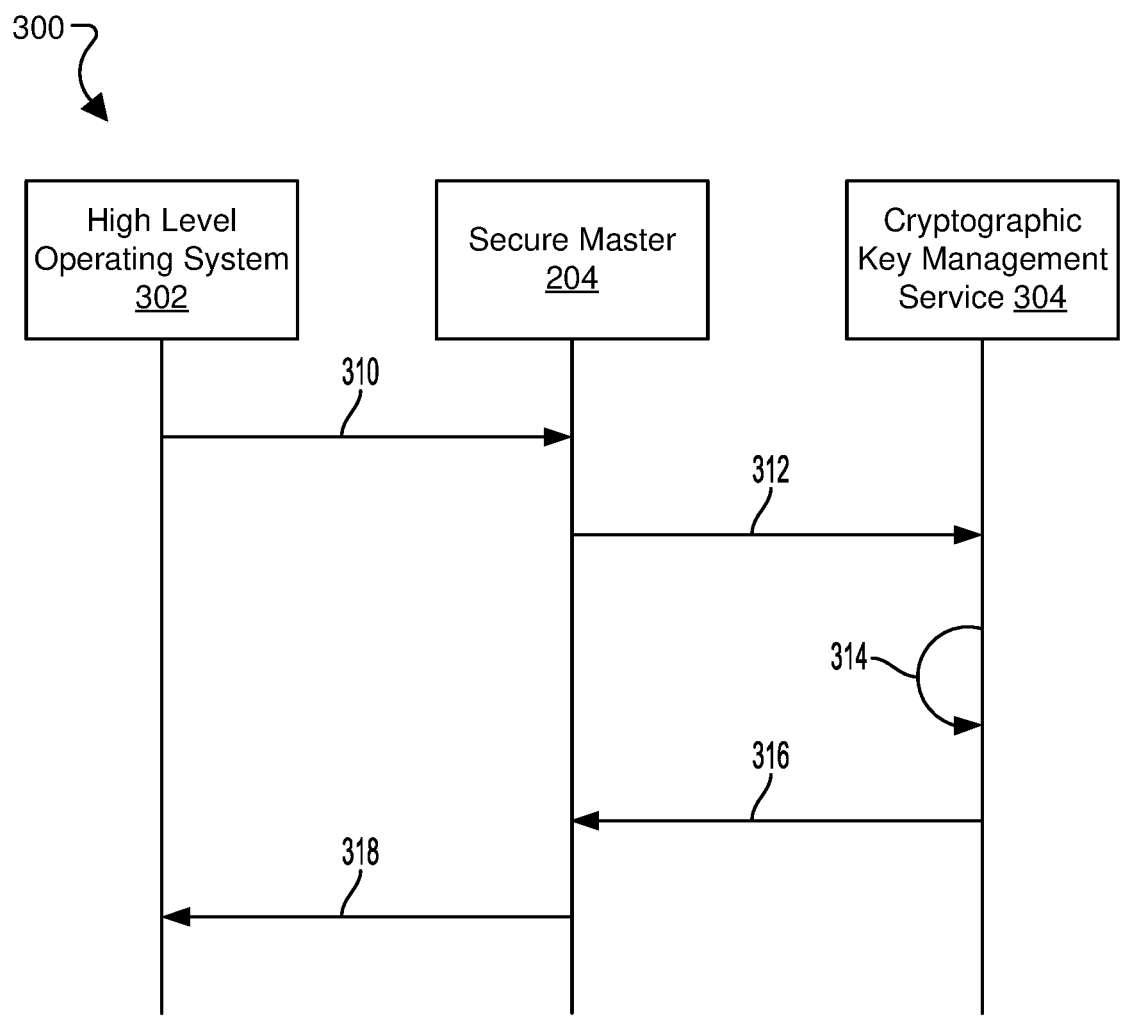
FIG. 3 is a component block signaling diagram illustrating an example of programming cryptographic keys in the cryptographic key access control system suitable for implementing various embodiments.

FIG. 3 illustrates an example of programming cryptographic keys in the cryptographic key access control system suitable for implementing various embodiments. With reference to FIGS. 1-3, a high level operating system 302 (e.g., non-secure master 202 in FIGS. 2A and 2B), the secure master 204, and a cryptographic key management service 304 (executed by and/or as part of one or a combination of processors 14, integrated cryptographic module 38 in FIG. 1, secure master 204, integrated cryptographic engine 206, secure cryptographic key manager 208 in FIGS. 2A and 2B) may program cryptographic keys 300 in the cryptographic key access system (e.g., cryptography key access control system 200 in FIGS. 2A and 2B).

The high level operating system 302 may call for programming one or more cryptographic keys in the cryptographic key access system (step 310) to the secure master 204. In some examples, the call for programming one or more cryptographic keys may be configured to identify the one or more cryptographic keys and/or include a cryptographic key policy parameter. In some examples the cryptographic key policy parameter may be configured to indicate to the secure master 204 the cryptographic key policy and/or to enable the cryptographic key policy. In some examples, the cryptographic key policy may be the cryptographic key access control policy.

The secure master 204 may respond to the call (step 310) by calling for storing the association of the one or more cryptographic keys and the cryptographic key access control policy (step 312) to the cryptographic key management service 304. In some examples, the call for storing the association of the one or more cryptographic keys and the cryptographic key access control policy may be configured to identify the one or more cryptographic keys and/or include the cryptographic key policy parameter.

The cryptographic key management service 304 may respond to the call (step 312) by determining that the cryptographic key policy parameter identifies the cryptographic key access control policy and storing the association of the one or more cryptographic keys and the cryptographic key access control policy (step 314). The cryptographic key management service 304 may store the association of the one or more cryptographic keys and the cryptographic key access control policy to the integrated cryptographic engine (e.g., integrated cryptographic engine 206 in FIGS. 2A and 2B). For example, the integrated cryptographic engine may include a memory (not shown; e.g., memory 16 in FIG. 1) to which the association of the one or more cryptographic keys and the cryptographic key access control policy may be stored. The cryptographic key management service 304 may store the association of the one or more cryptographic keys and the cryptographic key access control policy in a file, a data structure, a database, etc. at the integrated cryptographic engine.

The cryptographic key management service 304 may return a cryptographic key reference to the secure manager 204 (step 316), and the secure manager 204 may return the cryptographic key reference to the high level operating system 302 (step 318). The cryptographic key reference may be used to identify one or more cryptographic keys for a data request to the cryptographic key access system.

Figure 4A:
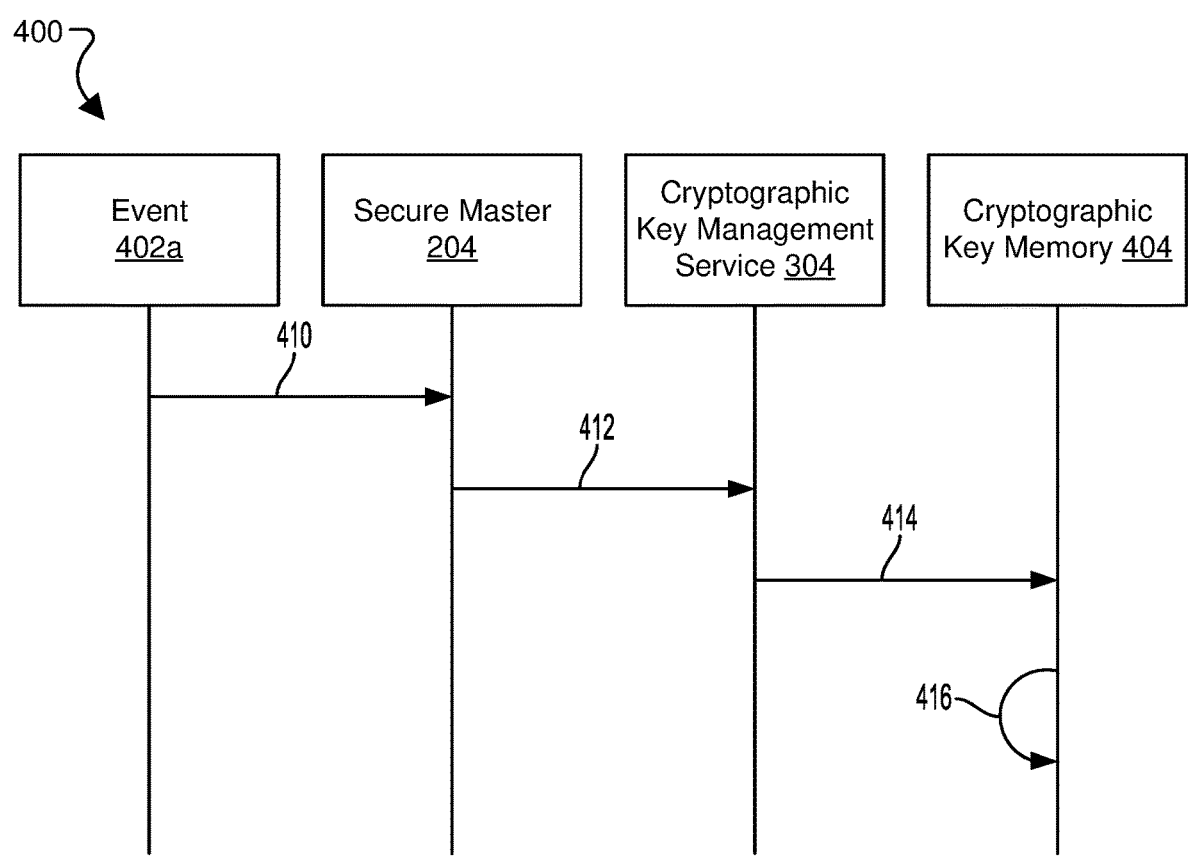
FIGS. 4A and 4B are component block signaling diagrams illustrating examples of disabling and enabling cryptographic key access in the cryptographic key access control system suitable for implementing various embodiments.
Figure 4B:
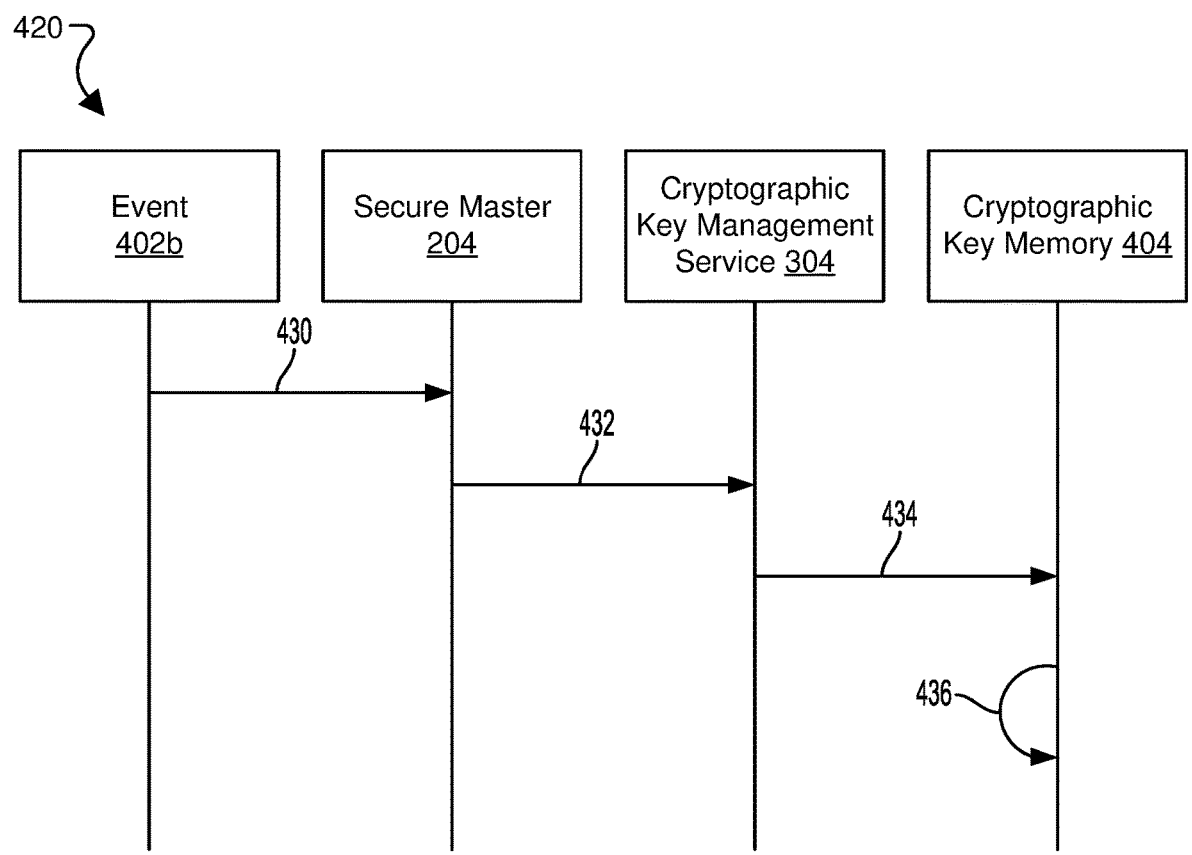

FIGS. 4A and 4B illustrate examples of disabling and enabling cryptographic key access in the cryptographic key access control system suitable for implementing various embodiments. With reference to FIGS. 1-4B, a cryptographic key access control event 402a, 402b may trigger disabling cryptographic key access 400 and enabling cryptographic key access 420 in the cryptographic key access control system (e.g., cryptographic key access control system 200 in FIGS. 2A and 2B).

In the example illustrated in FIG. 4A, the cryptographic key access control event 402a may trigger disabling cryptographic key access 400 in the key access control system. The cryptographic key access control event 402a may trigger a non-secure master (e.g., non-secure master 202 in FIG. 2A) to send a cryptographic key access control event signal (e.g., a cryptographic key access control event signal 220 FIG. 2A) (step 410) to a secure master 204.

The secure master 204 may respond to the signal (step 410) by sending a call to disable the cryptographic key access (step 412) to the cryptographic key management service 304. In some examples, the call (step 412) may include a cryptographic key reference for one or more cryptographic keys for which to disable the cryptographic key access. In some examples, the cryptographic key reference may be used to identify one or more cryptographic keys. The secure master 204 may retrieve the cryptographic key reference for the one or more cryptographic keys associated with the cryptographic key access control policy stored at the integrated cryptographic engine (e.g., integrated cryptographic engine 206 in FIGS. 2A and 2B). For example, the integrated cryptographic engine may include a memory (not shown; e.g., memory 16 in FIG. 1) to which the association of the one or more cryptographic keys, which may be represented by a cryptographic key reference, and the cryptographic key access control policy may be stored.

The cryptographic key management service 304 may respond to the call (step 412) by updating the cryptographic key access indicators associated with the cryptographic keys identified using the cryptographic key reference to a disable value (step 414). A cryptographic key memory 404 (e.g., memory 16 in FIG. 1), that may be part of the integrated cryptographic engine, may store the updated cryptographic key access indicators associated with the cryptographic keys (step 416). The cryptographic key memory 404 may store the association of the updated cryptographic key access indicators associated with the cryptographic keys in a file, a data structure, a database, etc. at the integrated cryptographic engine.

In the example illustrated in FIG. 4B, the cryptographic key access control event 402b may trigger enabling cryptographic key access 420 in the key access control system. The cryptographic key access control event 402b may trigger a non-secure master (e.g., non-secure master 202 in FIG. 2A) to send a cryptographic key access control event signal (e.g., a cryptographic key access control event signal 220 FIG. 2A) (step 430) to a secure master 204.

The secure master 204 may respond to the signal (step 430) by sending a call to enable the cryptographic key access (step 432) to the cryptographic key management service 304. In some examples, the call (step 432) may include a cryptographic key reference for one or more cryptographic keys for which to enable the cryptographic key access. In some examples, the cryptographic key reference may be used to identify one or more cryptographic keys. The secure master 204 may retrieve the cryptographic key reference for the one or more cryptographic keys associated with the cryptographic key access control policy stored at the integrated cryptographic engine (e.g., integrated cryptographic engine 206 in FIGS. 2A and 2B). For example, the integrated cryptographic engine may include a memory (not shown; e.g., memory 16 in FIG. 1) to which the association of the one or more cryptographic keys, which may be represented by a cryptographic key reference, and the cryptographic key access control policy may be stored.

The cryptographic key management service 304 may respond to the call (step 432) by updating the cryptographic key access indicators associated with the cryptographic keys identified using the cryptographic key reference to an enable value (step 434). A cryptographic key memory 404 (e.g., memory 16 in FIG. 1), that may be part of the integrated cryptographic engine, may store the updated cryptographic key access indicators associated with the cryptographic keys (step 436). The cryptographic key memory 404 may store the association of the updated cryptographic key access indicators associated with the cryptographic keys in a file, a data structure, a database, etc. at the integrated cryptographic engine.

Figure 5:
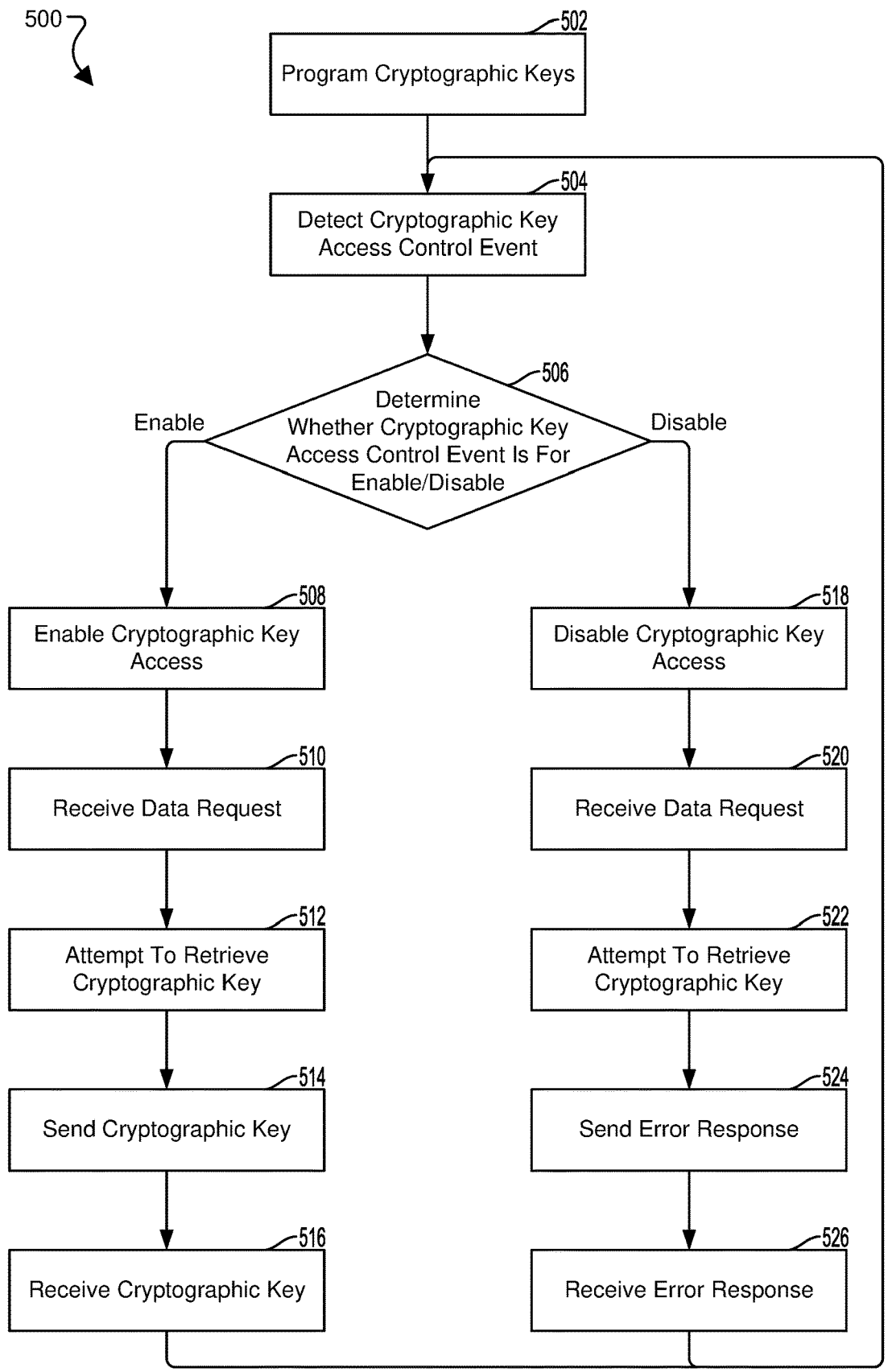
FIG. 5 is a process flows diagram illustrating a method of management of cryptographic keys for an integrated cryptographic engine according to some embodiments.

FIG. 5 illustrates a method of management of cryptographic keys for an integrated cryptographic engine according to some embodiments. With reference to FIGS. 1-5, the method 500 may be implemented in a computing device (e.g., computing device 10 in FIG. 1), in software executing in a processor (e.g., processor 14, integrated cryptographic module 38 in FIG. 1, integrated cryptographic engine 206 in FIGS. 2A and 2B), in general purpose hardware, in dedicated hardware (e.g., integrated cryptographic module 38 in FIG. 1, secure master 204, integrated cryptographic engine 206, secure cryptographic key manager 208 in FIGS. 2A and 2B), or in a combination of a software-configured processor and dedicated hardware, such as a processor executing software within a cryptographic key access control system (e.g., cryptographic key access control system 200 in FIGS. 2A and 2B) that includes other individual components, and various memory/cache controllers. In order to encompass the alternative configurations enabled in various embodiments, the hardware implementing the method 500 is referred to herein as an "integrated cryptographic device."

In block 502, the integrated cryptographic device may program cryptographic keys. Program cryptographic keys is described further herein for the method 600 with reference to FIG. 6. In some embodiments, the integrated cryptographic device programming cryptographic keys in block 502 may include a processor (e.g., processor 14, integrated cryptographic module 38 in FIG. 1, integrated cryptographic engine 206 in FIGS. 2A and 2B), an integrated cryptographic module (e.g., integrated cryptographic module 38 in FIG. 1), a secure master (e.g., secure master 204 in FIGS. 2A and 2B), an integrated cryptographic engine (e.g., integrated cryptographic engine 206 in FIGS. 2A and 2B), and/or a secure cryptographic key manager (e.g., secure cryptographic key manager 208 in FIGS. 2A and 2B).

In block 504, the integrated cryptographic device may detect a cryptographic key access control event. The cryptographic key access control event may be an event that triggers the integrated cryptographic device to implement a cryptographic key access control policy, such as by disabling and/or enabling cryptographic key access. The cryptographic key access control event may include a change in computing device state of a computing device (e.g., computing device 10 in FIG. 1). For example, the cryptographic key access control event may include switching between a lock state and an unlock state, etc. The integrated cryptographic device may receive an indication of the integrated cryptographic key access control event from a component of the computing device, such as a non-secure master (e.g., non-secure master 202 in FIGS. 2A and 2B). In some embodiments, the integrated cryptographic device detecting the cryptographic key access control event in block 504 may include the processor, the integrated cryptographic module, and/or the secure master.

In determination block 506, the integrated cryptographic device may determine whether the cryptographic key access control event is for disabling cryptographic key access or enabling cryptographic key access. The integrated cryptographic device may be configured to interpret different cryptographic key access control events for trigger disabling and/or enabling cryptographic key access. For example, the integrated cryptographic device may be configured to interpret that the cryptographic key access control event of the computing device being in a locked state is for disabling cryptographic key access. Similarly, the integrated cryptographic device may be configured to interpret that the cryptographic key access control event of the computing device being in an unlocked state is for enabling cryptographic key access. In some embodiments, the integrated cryptographic device determining whether the cryptographic key access control event is for disabling cryptographic key access or enabling cryptographic key access in determination block 506 may include the processor, the integrated cryptographic module, and/or the secure master.

In response to determining that the cryptographic key access control event is for enabling cryptographic key access (i.e., determination block 506="Enable"), the integrated cryptographic device may enable cryptographic key access in block 508. The integrated cryptographic device may identify cryptographic keys for which the cryptographic key access control policy is enabled. For example, the integrated cryptographic device may retrieve information relating to the cryptographic keys stored in a memory (e.g., memory 16 in FIG. 1) in a manner associated with an indication that the cryptographic key access control policy is enabled. The integrated cryptographic device may use the information relating to the cryptographic keys for which the cryptographic key access control policy is enabled to update associated cryptographic key access indicators to an enable value. For example, the integrated cryptographic device may identify the cryptographic keys for which to update the cryptographic key access indicators the information relating to the cryptographic keys for which the cryptographic key access control policy stored in a memory (e.g., memory 16 in FIG. 1, cryptographic key memory 404 in FIGS. 4A and 4B) and set the cryptographic key access indicators to an enable value. In some embodiments, the integrated cryptographic device enabling cryptographic key access in block 508 may include the processor, the integrated cryptographic module, the secure master, the integrated cryptographic engine, and/or the secure cryptographic key manager.

In block 510, the integrated cryptographic device may receive a data request from the non-secure master. The data request may be a read and/or write request for which the integrated cryptographic device may decrypt and/or encrypt data using a cryptographic key implement. In some embodiments, the integrated cryptographic device receiving the data request from the non-secure master in block 510 may include the processor, the integrated cryptographic module, and/or the integrated cryptographic engine.

In block 512, the integrated cryptographic device may attempt to retrieve the cryptographic key. The integrated cryptographic device may determine that the cryptographic key access indicator for the cryptographic key is set to an enable value. In some examples, the integrated cryptographic device may retrieve the cryptographic key from the memory storing the cryptographic key. In some examples, the integrated cryptographic device may retrieve a location for the cryptographic key at the memory storing the cryptographic key. In some embodiments, the integrated cryptographic device attempting to retrieve the cryptographic key in block 512 may include the processor, the integrated cryptographic module, the integrated cryptographic engine, and/or the secure cryptographic key manager.

In block 514, the integrated cryptographic device may send the cryptographic key. For example, the integrated cryptographic device may send the cryptographic key internally from one component of the integrated cryptographic device to another component of the integrated cryptographic device. In some examples, the integrated cryptographic device may send the cryptographic key retrieved from memory. In some examples, the integrated cryptographic device may send the location for the cryptographic key at the memory. In some embodiments, the integrated cryptographic device sending the cryptographic key in block 514 may include the processor, the integrated cryptographic module, the integrated cryptographic engine, and/or the secure cryptographic key manager.

In block 516, the integrated cryptographic device may receive the cryptographic key. For example, the integrated cryptographic device may receive the cryptographic key internally at one component of the integrated cryptographic device from another component of the integrated cryptographic device. In some examples, the integrated cryptographic device may receive the cryptographic key retrieved from memory. In some examples, the integrated cryptographic device may receive the location for the cryptographic key at the memory. In some embodiments, the integrated cryptographic device receiving the cryptographic key in block 516 may include the processor, the integrated cryptographic module, and/or the integrated cryptographic engine.

In response to determining that the cryptographic key access control event is for disabling cryptographic key access (i.e., determination block 506="Disable"), the integrated cryptographic device may disable cryptographic key access in block 518. The integrated cryptographic device may disable cryptographic key access in a manner similar to enabling cryptographic key access in block 508, by setting the cryptographic key access indicators to a disable value rather than an enable value. In some embodiments, the integrated cryptographic device disabling cryptographic key access in block 518 may include the processor, the integrated cryptographic module, the secure master, the integrated cryptographic engine, and/or the secure cryptographic key manager.

In block 520, the integrated cryptographic device may receive a data request from the non-secure master. The data request may be a read and/or write request for which the integrated cryptographic device may decrypt and/or encrypt data using a cryptographic key implement. In some embodiments, the integrated cryptographic device receiving the data request from the non-secure master in block 520 may include the processor, the integrated cryptographic module, and/or the integrated cryptographic engine.

In block 522, the integrated cryptographic device may attempt to retrieve the cryptographic key. The integrated cryptographic device may determine that the cryptographic key access indicator for the cryptographic key is set to a disable value. The integrated cryptographic device may fail to retrieve the cryptographic key. In some embodiments, the integrated cryptographic device attempting to retrieve the cryptographic key in block 522 may include the processor, the integrated cryptographic module, the integrated cryptographic engine, and/or the secure cryptographic key manager.

In block 524, the integrated cryptographic device may send an error response. The integrated cryptographic device failing to retrieve the cryptographic key may generate and send an error response for the failure. For example, the integrated cryptographic device may send the error response internally from one component of the integrated cryptographic device to another component of the integrated cryptographic device. In some embodiments, the integrated cryptographic device sending the error response in block 524 may include the processor, the integrated cryptographic module, the integrated cryptographic engine, and/or the secure cryptographic key manager.

In block 526, the integrated cryptographic device may receive the error response. For example, the integrated cryptographic device may receive the error response internally at one component of the integrated cryptographic device from another component of the integrated cryptographic device. In some embodiments, the integrated cryptographic device receiving the error response in block 526 may include the processor, the integrated cryptographic module, and/or the integrated cryptographic engine.

Figure 6:
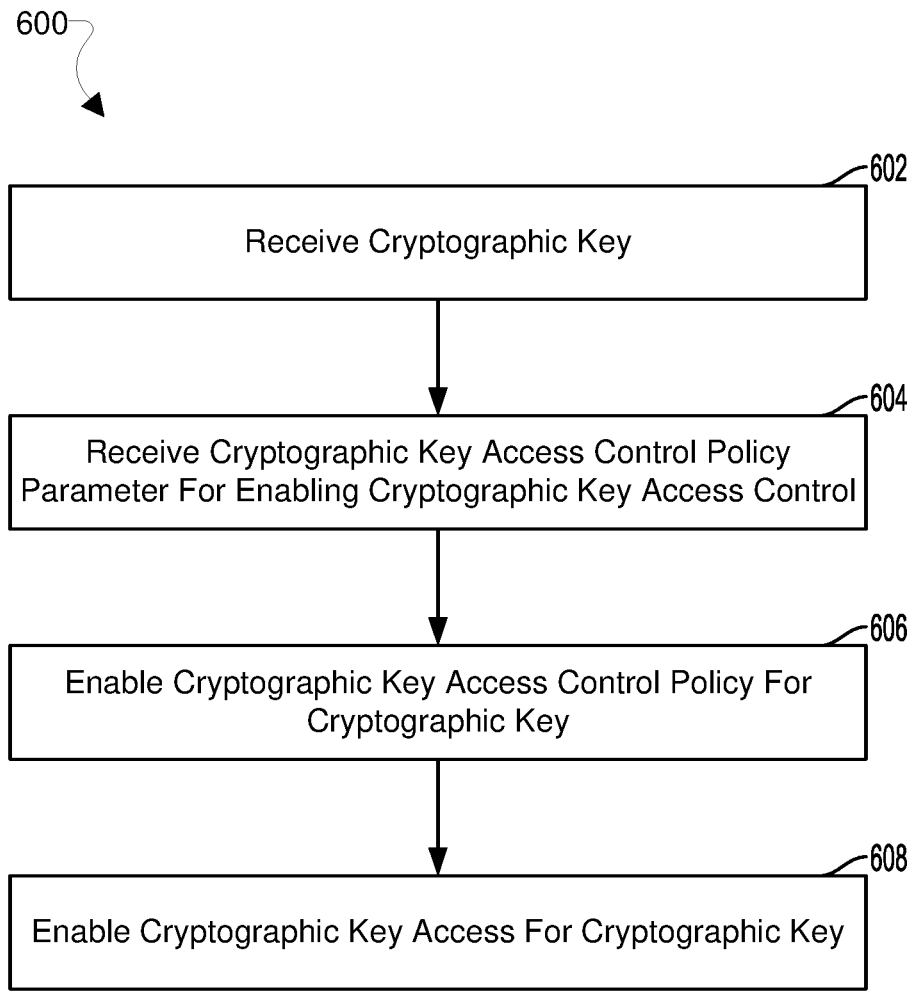
FIG. 6 is a process flow diagram illustrating a method of programming cryptographic keys for the integrated cryptographic engine according to some embodiments.

FIG. 6 illustrates a method of programming cryptographic keys for the integrated cryptographic engine according to some embodiments. With reference to FIGS. 1-6, the method 600 may be implemented in a computing device (e.g., computing device 10 in FIG. 1), in software executing in a processor (e.g., processor 14, integrated cryptographic module 38 in FIG. 1, integrated cryptographic engine 206 in FIGS. 2A and 2B), in general purpose hardware, in dedicated hardware (e.g., integrated cryptographic module 38 in FIG. 1, secure master 204, integrated cryptographic engine 206, secure cryptographic key manager 208 in FIGS. 2A and 2B), or in a combination of a software-configured processor and dedicated hardware, such as a processor executing software within a cryptographic key access control system (e.g., cryptographic key access control system 200 in FIGS. 2A and 2B) that includes other individual components, and various memory/cache controllers. In order to encompass the alternative configurations enabled in various embodiments, the hardware implementing the method 600 is referred to herein as an "integrated cryptographic device."

In block 602, the integrated cryptographic device may receive a cryptographic key. The integrated cryptographic device may receive a cryptographic key from a memory (e.g., memory 24 in FIG. 1, secure non-volatile memory 210 in FIGS. 2A and 2B). In some embodiments, the integrated cryptographic device receiving the cryptographic key in block 602 may include a processor (e.g., processor 14, integrated cryptographic module 38 in FIG. 1, integrated cryptographic engine 206 in FIGS. 2A and 2B), an integrated cryptographic module (e.g., integrated cryptographic module 38 in FIG. 1), and/or a secure master (e.g., secure master 204 in FIGS. 2A and 2B).

In block 604, the integrated cryptographic device may receive a cryptographic key access control policy parameter for enabling a cryptographic key access control policy. In some examples, the received cryptographic key and the received cryptographic key access control policy parameter may be part of a call for programming the cryptographic key and/or enabling cryptographic key access control for the cryptographic key. In some embodiments, the integrated cryptographic device receiving the cryptographic key access control policy parameter for enabling the cryptographic key access control policy in block 604 may include the processor, the integrated cryptographic module, and/or the secure master.

In block 606, the integrated cryptographic device may enable the cryptographic key access control policy for the cryptographic key. Enabling the cryptographic key access control policy may include the integrated cryptographic device storing an association of the cryptographic key with a cryptographic key access control policy indicator in a file, a data structure, a database, etc. in a memory (not shown; e.g., memory 16 in FIG. 1). In some embodiments, the integrated cryptographic device enabling the cryptographic key access control policy for the cryptographic key in block 606 may include the processor, the integrated cryptographic module, and/or the secure master.

In block 608, the integrated cryptographic device may enable cryptographic key access for the cryptographic key. Enabling the cryptographic key access may include the integrated cryptographic device storing an association of the cryptographic key with a cryptographic key access indicator in a file, a data structure, a database, etc. in a memory (not shown; e.g., memory 16 in FIG. 1). In some embodiments, the integrated cryptographic device enabling cryptographic key access for the cryptographic key in block 608 may include the processor, the integrated cryptographic module, an integrated cryptographic engine (e.g., integrated cryptographic engine 206 in FIGS. 2A and 2B), and/or a secure cryptographic key manager (e.g., secure cryptographic key manager 208 in FIGS. 2A and 2B).

Figure 7:
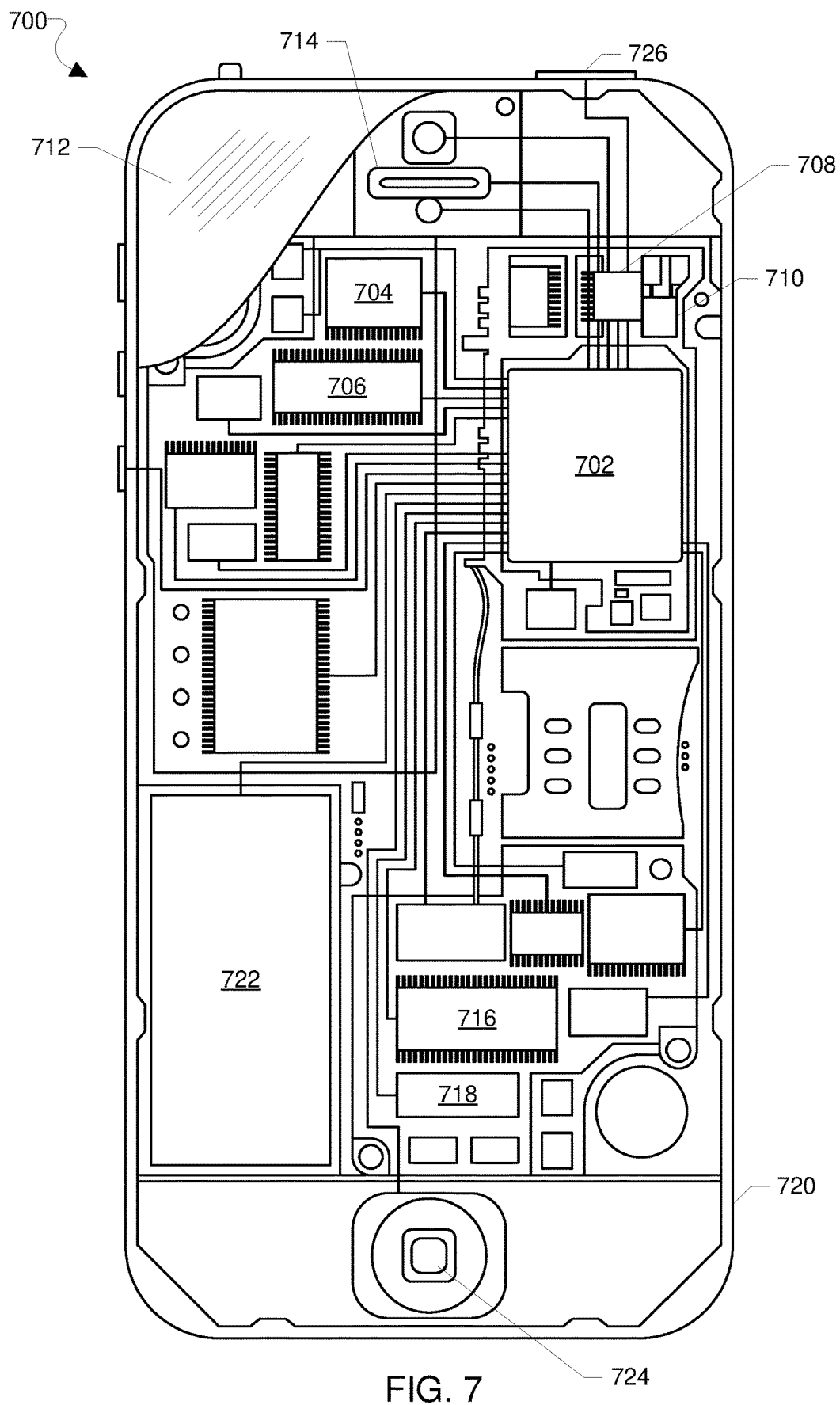
FIG. 7 is a component block diagram illustrating an example mobile computing device suitable for implementing various embodiments.

Various embodiments (including, but not limited to, embodiments described above with reference to FIGS. 1-6) may be implemented in a wide variety of computing systems including mobile computing devices, an example of which suitable for use with the various embodiments is illustrated in FIG. 7. The mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, embedded DRAM, non-volatile flash memory, UFS, SDCC, etc. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile computing device 700 need not have touch screen capability.

The mobile computing device 700 may have one or more radio signal transceivers 708 (e.g., Peanut, Bluetooth, Zig-Bee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor 702.

The mobile computing device 700 may include a peripheral device connection interface 718 coupled to the processor 702. The peripheral device connection interface 718 may be singularly configured to accept one type of connection or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components described herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
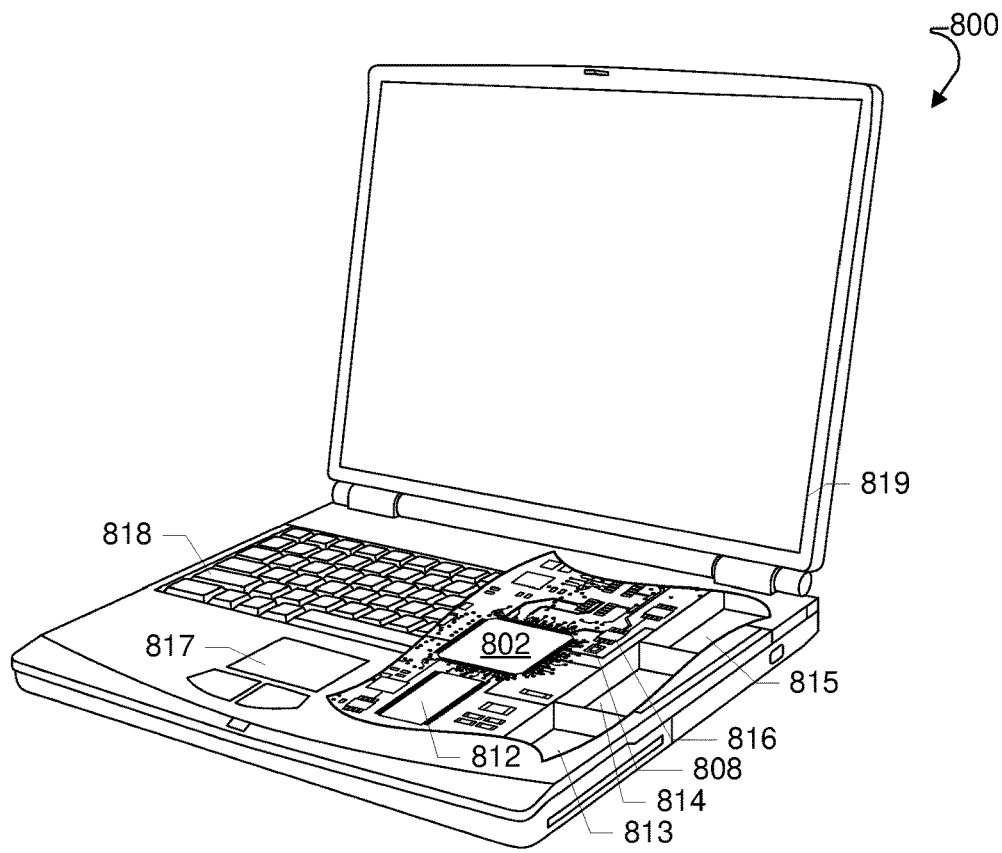
FIG. 8 is a component block diagram illustrating an example mobile computing device suitable for implementing various embodiments.

The various embodiments (including, but not limited to, embodiments described above with reference to FIGS. 1-6) may be implemented in a wide variety of computing systems including a laptop computer 800, an example of which is illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 802 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 802. The computer 800 may also include a floppy disc drive 814 and a compact disc (CD) drive 815 coupled to the processor 802. In a notebook configuration, the computer housing includes the touchpad 817, the keyboard 818, and the display 819 all coupled to the processor 802. Other configurations of the computing device may include a computer mouse or trackball coupled to the processor 802 (e.g., via a USB input) as are well known, which may also be used in conjunction with the various embodiments.

Figure 9:
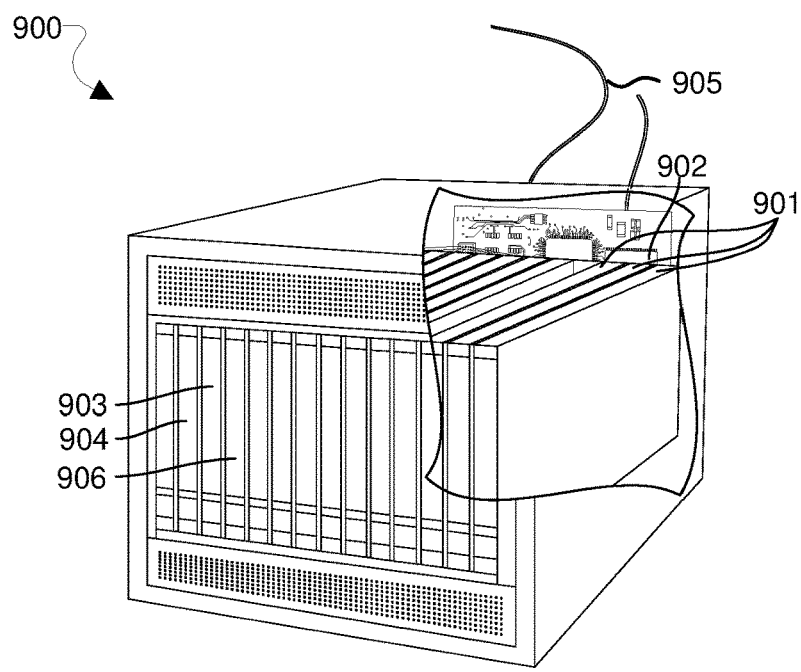
FIG. 9 is a component block diagram illustrating an example server suitable for implementing various embodiments.

The various embodiments (including, but not limited to, embodiments described above with reference to FIGS. 1-6) may also be implemented in fixed computing systems, such as any of a variety of commercially available servers. An example server 900 is illustrated in FIG. 9. Such a server 900 typically includes one or more multicore processor assemblies 901 coupled to volatile memory 902 and a large capacity nonvolatile memory, such as a disk drive 904. As illustrated in FIG. 9, multicore processor assemblies 901 may be added to the server 900 by inserting them into the racks of the assembly. The server 900 may also include a floppy disc drive, compact disc (CD) or digital versatile disc (DVD) disc drive 906 coupled to the processor 901. The server 900 may also include network access ports 903 coupled to the multicore processor assemblies 901 for establishing network interface connections with a network 905, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Computer program code or "program code" for execution on a programmable processor for carrying out operations of the various embodiments may be written in a high-level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Implementation examples are described in the following paragraphs. While some of the following implementation examples are described in terms of example systems, devices, or methods, further example implementations may include: the example systems or devices discussed in the following paragraphs implemented as a method executing operations of the example systems or devices; the example systems, devices, or methods discussed in the following paragraphs implemented by an inline cryptographic device configured to perform operations of the example systems, devices, or methods; the example systems, devices, or methods discussed in the following paragraphs implemented by a computing device comprising a processing device configured with processing device-executable instructions to perform operations of the example systems, devices, or methods; a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. A method implemented in a processor for management of cryptographic keys of an integrated cryptographic engine, including: detecting a cryptographic key access control event; determining whether the cryptographic key access control event is for disabling cryptographic key access at a cryptographic key memory of the integrated cryptographic engine; disabling cryptographic key access at the cryptographic key memory in response to determining that the cryptographic key access control event is for disabling cryptographic key access at the cryptographic key memory; and maintaining one or more cryptographic keys at the cryptographic key memory for which cryptographic key access is disabled.

Example 2. The method of example 1, further including, following disabling cryptographic key access at the cryptographic key memory: receiving a data request; attempting to retrieve a cryptographic key from the cryptographic key memory; and sending an error response.

Example 3. The method of either of examples 1 or 2, in which disabling cryptographic key access at the cryptographic key memory includes setting one or more cryptographic key access indicators associated with the one or more cryptographic keys to a disable value.

Example 4. The method of any of examples 1-3, further including enabling cryptographic key access at the cryptographic key memory in response to determining that the cryptographic key access control event is not for disabling cryptographic key access at the cryptographic key memory.

Example 5. The method of example 4, further including, following enabling cryptographic key access at the cryptographic key memory: receiving a data request; attempting to retrieve a cryptographic key from the cryptographic key memory; and sending the cryptographic key.

Example 6. The method of either of examples 4 or 5, in which enabling cryptographic key access at the cryptographic key memory includes setting one or more cryptographic key access indicators associated with the one or more cryptographic keys to an enable value.

Example 7. The method of any of examples 1-6, further including: receiving a cryptographic key access control policy parameter for the one or more cryptographic keys configured to enable a cryptographic key access control policy; and enabling the cryptographic key access control policy for the one or more cryptographic keys in response to receiving the cryptographic key access control policy parameter.

Example 8. The method of example 7, in which enabling the cryptographic key access control policy for the one or more cryptographic keys includes associating the one or more cryptographic keys with one or more one or more cryptographic key access indicators.

The foregoing method descriptions and the process flow diagrams are provided merely as illustrative examples and are not intended to require or imply that the operations of the various embodiments must be performed in the order presented. The order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein but is to be accorded the widest scope consistent with the following claims and the principles and novel features disclosed herein.

What is claimed is:

1. A method implemented in a processor for management of cryptographic keys of an integrated cryptographic engine, comprising:
   detecting, by a secure master, a cryptographic key access control event from a non-secure master configured to indicate enabling or disabling of cryptographic key access, wherein the secure master is configured to control access to one or more groups of cryptographic keys based on the cryptographic key access control event received from the non-secure master, and wherein the non-secure master is implemented in one or more applications;
   determining whether the cryptographic key access control event is for disabling cryptographic key access at a cryptographic key memory of the integrated cryptographic engine;
   disabling cryptographic key access at the cryptographic key memory in response to determining that the cryptographic key access control event is for disabling cryptographic key access at the cryptographic key memory; and
   maintaining one or more cryptographic keys at the cryptographic key memory for which cryptographic key access is disabled.

2. The method of claim 1, further comprising, following disabling cryptographic key access at the cryptographic key memory:
   receiving a data request from the non-secure master;
   attempting to retrieve a cryptographic key from the cryptographic key memory; and
   sending an error response to the non-secure master.

3. The method of claim 1, wherein disabling cryptographic key access at the cryptographic key memory comprises setting one or more cryptographic key access indicators associated with the one or more cryptographic keys to a disable value.

4. The method of claim 1, further comprising enabling cryptographic key access at the cryptographic key memory in response to determining that the cryptographic key access control event is not for disabling cryptographic key access at the cryptographic key memory.

5. The method of claim 4, further comprising, following enabling cryptographic key access at the cryptographic key memory:
   receiving a data request;
   attempting to retrieve a cryptographic key from the cryptographic key memory; and
   sending the cryptographic key.

6. The method of claim 4, wherein enabling cryptographic key access at the cryptographic key memory comprises setting one or more cryptographic key access indicators associated with the one or more cryptographic keys to an enable value.

7. The method of claim 1, further comprising:
   receiving a cryptographic key access control policy parameter for the one or more cryptographic keys configured to enable a cryptographic key access control policy; and
   enabling the cryptographic key access control policy for the one or more cryptographic keys in response to receiving the cryptographic key access control policy parameter.

8. The method of claim 7, wherein enabling the cryptographic key access control policy for the one or more cryptographic keys comprises associating the one or more cryptographic keys with one or more one or more cryptographic key access indicators.

9. A computing device, comprising a processor configured to:
   detect, by a secure master, a cryptographic key access control event from a non-secure master configured to indicate enabling or disabling of cryptographic key access, wherein the secure master is configured to control access to one or more groups of cryptographic keys based on the cryptographic key access control event received from the non-secure master, and wherein the non-secure master is implemented in one or more applications;
   determine whether the cryptographic key access control event is for disabling cryptographic key access at a cryptographic key memory of an integrated cryptographic engine;
   disable cryptographic key access at the cryptographic key memory in response to determining that the cryptographic key access control event is for disabling cryptographic key access at the cryptographic key memory; and
   maintain one or more cryptographic keys at the cryptographic key memory for which cryptographic key access is disabled.

10. The computing device of claim 9, wherein the processor is further configured to:
    receive a data request from the non-secure master;
    attempt to retrieve a cryptographic key from the cryptographic key memory for which cryptographic key access is disabled; and
    send an error response to the non-secure master.

11. The computing device of claim 9, wherein the processor is further configured to set one or more cryptographic key access indicators associated with the one or more cryptographic keys to a disable value.

12. The computing device of claim 9, wherein the processor is further configured to enable cryptographic key access at the cryptographic key memory in response to determining that the cryptographic key access control event is not for disabling cryptographic key access at the cryptographic key memory.

13. The computing device of claim 12, wherein the processor is further configured to:
receive a data request;
attempt to retrieve a cryptographic key from the cryptographic key memory for which cryptographic key access is enabled; and
send the cryptographic key.

14. The computing device of claim 12, wherein the computing device is further configured to set one or more cryptographic key access indicators associated with the one or more cryptographic keys to an enable value.

15. The computing device of claim 9, wherein the computing device is further configured to:
receive a cryptographic key access control policy parameter for the one or more cryptographic keys configured to enable a cryptographic key access control policy; and
enable the cryptographic key access control policy for the one or more cryptographic keys in response to receiving the cryptographic key access control policy parameter.

16. The computing device of claim 9, wherein the computing device is further configured to associate the one or more cryptographic keys with one or more one or more cryptographic key access indicators.

17. A computing device, comprising:
means for detecting, by a secure master, a cryptographic key access control event from a non-secure master configured to indicate enabling or disabling of cryptographic key access, wherein the secure master is configured to control access to one or more groups of cryptographic keys based on the cryptographic key access control event received from the non-secure master, and wherein the non-secure master is implemented in one or more applications;
means for determining whether the cryptographic key access control event is for disabling cryptographic key access at a cryptographic key memory of an integrated cryptographic engine;
means for disabling cryptographic key access at the cryptographic key memory in response to determining that the cryptographic key access control event is for disabling cryptographic key access at the cryptographic key memory; and
means for maintaining one or more cryptographic keys at the cryptographic key memory for which cryptographic key access is disabled.

18. The computing device of claim 17, further comprising:
means for receiving a data request from the non-secure master;
means for attempting to retrieve a cryptographic key from the cryptographic key memory for which cryptographic key access is disabled; and
means for sending an error response to the non-secure master.

19. The computing device of claim 17, wherein means for disabling cryptographic key access at the cryptographic key memory comprises means for setting one or more cryptographic key access indicators associated with the one or more cryptographic keys to a disable value.

20. The computing device of claim 17, further comprising means for enabling cryptographic key access at the cryptographic key memory in response to determining that the cryptographic key access control event is not for disabling cryptographic key access at the cryptographic key memory.

21. The computing device of claim 20, further comprising:
means for receiving a data request;
means for attempting to retrieve a cryptographic key from the cryptographic key memory for which cryptographic key access is enabled; and
means for sending the cryptographic key.

22. The computing device of claim 20, wherein means for enabling cryptographic key access at the cryptographic key memory comprises means for setting one or more cryptographic key access indicators associated with the one or more cryptographic keys to an enable value.

23. The computing device of claim 17, further comprising:
means for receiving a cryptographic key access control policy parameter for the one or more cryptographic keys configured to enable a cryptographic key access control policy; and
means for enabling the cryptographic key access control policy for the one or more cryptographic keys in response to receiving the cryptographic key access control policy parameter.

24. The computing device of claim 23, wherein means for enabling the cryptographic key access control policy for the one or more cryptographic keys comprises means for associating the one or more cryptographic keys with one or more one or more cryptographic key access indicators.

25. A non-transitory processor-readable medium having stored thereon processor executable instructions configured to cause a processor of a computing device to perform operations comprising:
detecting, by a secure master, a cryptographic key access control event from a non-secure master configured to indicate enabling or disabling of cryptographic key access, wherein the secure master is configured to control access to one or more groups of cryptographic keys based on the cryptographic key access control event received from the non-secure master, and wherein the non-secure master is implemented in one or more applications;
determining whether the cryptographic key access control event is for disabling cryptographic key access at a cryptographic key memory of an integrated cryptographic engine;
disabling cryptographic key access at the cryptographic key memory in response to determining that the cryptographic key access control event is for disabling cryptographic key access at the cryptographic key memory; and
maintaining one or more cryptographic keys at the cryptographic key memory for which cryptographic key access is disabled.

26. The non-transitory processor-readable medium of claim 25, wherein the stored processor-executable instructions are configured to cause the processor to perform operations further comprising, following disabling cryptographic key access at the cryptographic key memory:
receiving a data request from the non-secure master;
attempting to retrieve a cryptographic key from the cryptographic key memory; and sending an error response to the non-secure master.

27. The non-transitory processor-readable medium of claim 25, wherein the stored processor-executable instructions are configured to cause the processor to perform operations such that disabling cryptographic key access at the cryptographic key memory comprises setting one or more cryptographic key access indicators associated with the one or more cryptographic keys to a disable value.

28. The non-transitory processor-readable medium of claim 25, wherein the stored processor-executable instructions are configured to cause the processor to perform operations further comprising enabling cryptographic key access at the cryptographic key memory in response to determining that the cryptographic key access control event is not for disabling cryptographic key access at the cryptographic key memory.

29. The non-transitory processor-readable medium of claim 28, wherein the stored processor-executable instructions are configured to cause the processor to perform operations further comprising, following enabling cryptographic key access at the cryptographic key memory:
   receiving a data request;
   attempting to retrieve a cryptographic key from the cryptographic key memory; and
   sending the cryptographic key.

30. The non-transitory processor-readable medium of claim 28, wherein the stored processor-executable instructions are configured to cause the processor to perform operations such that enabling cryptographic key access at the cryptographic key memory comprises setting one or more cryptographic key access indicators associated with the one or more cryptographic keys to an enable value.

\* \* \* \* \*